Aug. 26, 1941.    G. E. PETROSKY    2,254,110
STORAGE BATTERY
Filed Feb. 1, 1939

WITNESS:

INVENTOR
George E. Petrosky
BY Augustus B. Stoughton
ATTORNEY.

Patented Aug. 26, 1941

2,254,110

UNITED STATES PATENT OFFICE 2,254,110

STORAGE BATTERY

George E. Petrosky, Philadelphia, Pa., assignor to The Electric Storage Battery Company, Philadelphia, Pa., a corporation of New Jersey Application February 1, 1939, Serial No. 253,973

2 Claims. (Cl. 136—170)

The present invention relates to storage batteries and more particularly to a flexible seal between the cover and the container.

The usual method of sealing the cover to the upper wall of the container or jar is to provide the cover with a depending flange which when the cover is inserted in the jar defines a channel or trough above the flange and between the inner wall of the jar and the bounding wall of the cover and into this channel or trough is poured molten sealing compound.

Under service conditions involving severe vibration, such as airplane service, there may exist sufficient relative movement between the cover and the jar to break the seal, especially at low temperature when the sealing compound becomes comparatively brittle.

The object of the present invention is to provide a flexible seal which will permit relative motion between the cover and the wall of the jar without opening the seal.

Other objects of the invention will appear from the following description at the end of which the invention will be claimed.

The object or result above set forth is accomplished by providing a strip of soft rubber or similar pliable material impervious to the electrolyte. This strip is applied and secured to the inner wall of the jar along its upper marginal face portion, and extends down to the bottom of the channel or trough provided by the bounding wall of the cover, the external flange of the cover and the inner face of the jar wall. The sealing compound is poured into the channel and fills it to a height not above the lower edge of the cement by which the upper marginal face of the strip is secured to the jar wall. Thus there is left a small area of the soft rubber strip which is free from the jar wall on one side and from the sealing compound on the other. The pliability of this portion of the strip permits sufficient and considerable relative motion between the cover and the jar without breaking the seal.

The invention comprises the improvements to be presently described and finally claimed.

In the following description reference will be made to the accompanying drawing forming part hereof and in which, Figure 1 is a transverse sectional view of so much of a storage battery as is necessary for the embodiment of the present invention therein.

Figure 1:
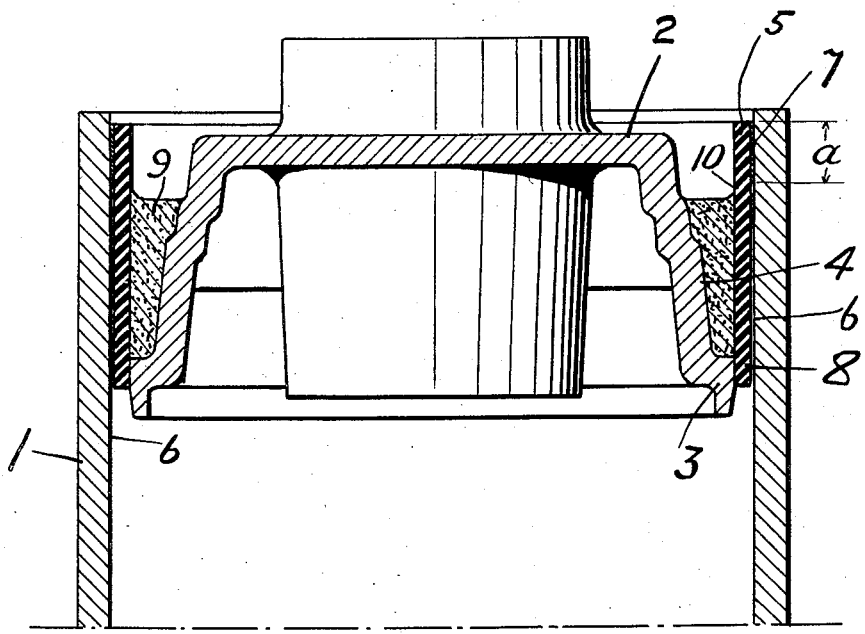

Referring to the drawing, 1 indicates the upper portion of a storage battery jar or container which is generally rectangular. 2 indicates a cover adapted to enter the open end of the jar. The cover is provided with an outwardly extending marginal flange 3 arranged at the bottom of the bounding wall 4 of the cover. 5 is a strip of soft rubber or rubber like pliable material impervious to the electrolyte. This strip is interposed between the bounding wall 4 of the cover and the inner face 6 of the jar wall. 7 indicates cement or the like at the outer face of one marginal portion of the strip 5 and the inner face of the jar wall. As shown the cement extends between the lines a, thus the lower marginal portion 8 of the strip, beneath the level of the cement at a, is free from the jar wall. 9 indicates sealing compound interposed between the bounding wall 4 of the cover above the flange 3 and the inner face of the strip 5 below the cement at a. The sealing compound is, of course, attached to the strip 5 and to the cover. The portion of the strip between the cement at a and the sealing compound 9, or in other words, the portion generally indicated at 10 provides a flexible intermediate portion.

Figures 2, 3:
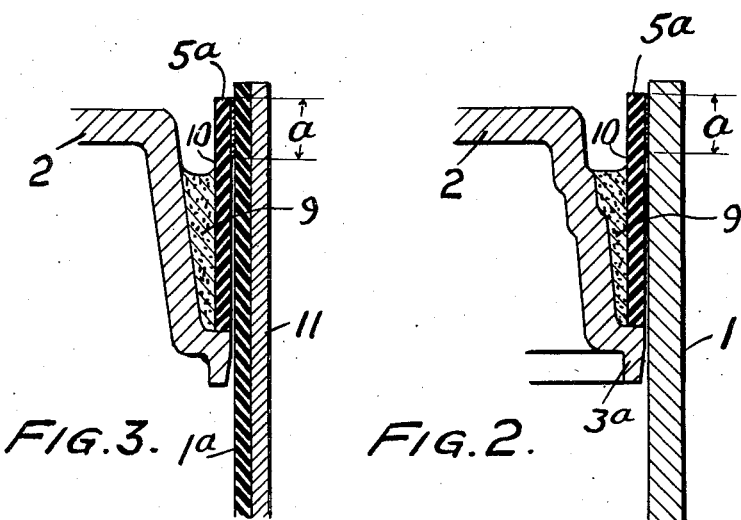
Figure 2 is a similar view illustrating a modification.
Figure 3 is a similar view illustrating another modification.

The construction and operation of the modification shown in Figure 2 are as above described except that the lower edge of the sealing strip 5ᵃ terminates above the flange 3ᵃ and the flange itself is disposed nearer to the inner wall of the jar than it is in Figure 1.

The construction and operation of the modification shown in Figure 3 are as above described except that the invention is shown in application to a jar 1ᵃ which is arranged in a metallic container 11. In this case the jar or container 1ᵃ may be of softer material than the jar 1 of Figures 1 and 2. The strip 5ᵃ is cemented to the rubber jar 1ᵃ in the manner herein above described, or may be attached by vulcanization.

I claim:

1. Means for imparting yieldability to the seal of a storage battery, comprising a strip of soft rubber having the marginal portion of one of its faces adherent to the sealing compound of the battery and having the marginal portion of its opposite face adherent to the inner wall of the jar of the battery, the adherent portions of the strip being spaced in a vertical direction to provide between them a free intermediate portion of the strip which imparts yieldability to the seal by compression and tension.

2. A flexible seal for a storage battery container having a cover provided with a depending bounding wall adapted to enter and closely fit along its lower periphery, the open end of the container, said bounding wall spaced away from the container wall above said lower periphery to provide a sealing channel, comprising a strip of pliable material impervious to the electrolyte, arranged vertically in said channel and cemented to the inner face of the container wall by means of a thin layer of cement located wholly above an intermediate point in the outer vertical surface of the strip, and sealing compound between the surface of the bounding wall of the cover and the inner surface of the strip adherent to both surfaces, and located wholly below said intermediate point, leaving a portion of said strip between the lower margin of the cement and the upper margin of the sealing compound unattached on either face.

GEORGE E. PETROSKY.